INVENTOR.
HUDSON F. FRANCOM
ATTORNEY

July 2, 1963 H. F. FRANCOM 3,096,278
SCRAPER ASSEMBLY FOR FILTERS
Filed March 9, 1959 5 Sheets-Sheet 4

INVENTOR.
HUDSON F. FRANCOM
BY
ATTORNEY

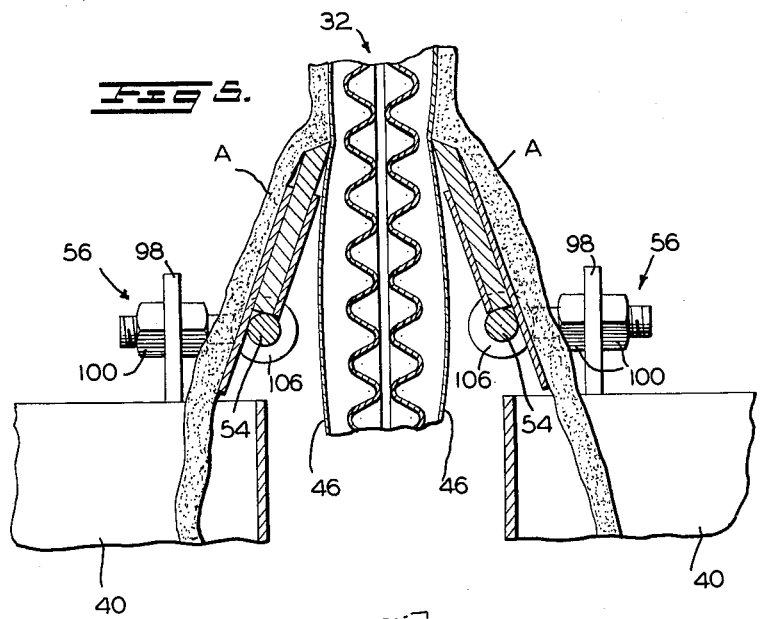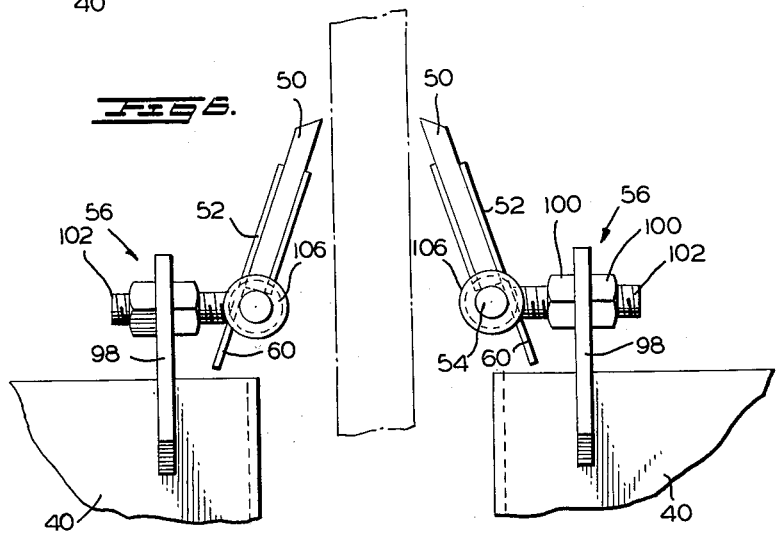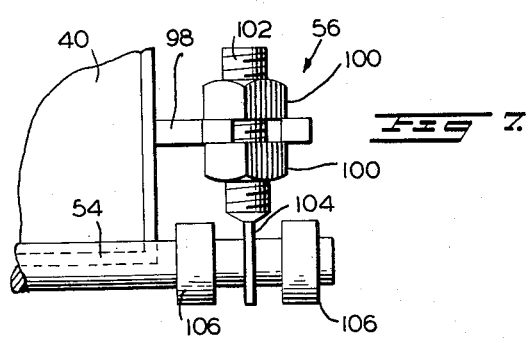

3,096,278
SCRAPER ASSEMBLY FOR FILTERS
Hudson F. Francom, Salt Lake City, Utah, assignor to
The Eimco Corporation, Salt Lake City, Utah, a corporation of Delaware
Filed Mar. 9, 1959, Ser. No. 798,216
1 Claim. (Cl. 210—327)

This invention relates to improvements in rotary disc filters and more particularly to a suspended scraper structure with movable scraper blades for removing filter cake from the filter discs of vacuum disc filters, as the discs rotate by the scraper blades.

Filter cake scrapers for disc type vacuum filters have in the past presented a difficult problem due to waver in filter discs, disc rings and filter disc sectors. Many of these problems would be eliminated were disc scrapers able to move with a free floating action to follow waver and misalignment of disc sectors and at the same time avoid uneven and excessive pressure on opposite sides of the disc sectors and sector filter bags. Known prior art scrapers have not provided these cooperating features and as a result there has been excessive filter bag wear, tearing of filter bags, blade binding on and damage of sectors and/or bending of the scraper blades.

It is therefore a major object of the present invention to provide a suspended and resiliently biased scraper structure which substantially eliminates many of the problems inherent in known prior art disc filter scrapers.

Another object is to provide floating filter scraper blade assemblies which will follow filter disc waver from side to side and which will maintain the scraping edges of the blades parallel with the disc sector surfaces.

A further object is to provide for pitch angle and spacing adjustment of filter disc scraper blades during operation.

Another object is to provide resiliently resisted flexing outwardly of the scraper blades to increase spacing of the blade scraping edges in order to avoid excessive scraping pressure on the filter bags during an air pressure blow discharge.

These and other objects and advantages are provided in a scraper blade assembly for a rotary disc filter, comprising a pair of shafts positioned on opposite sides of a disc of the disc filter, means rotatably mounting one end of each shaft adjacent the axis of rotation of the disc, spacer means rotatably mounting the other ends of each of said pair of shafts outwardly of the periphery of the disc, yieldable means supporting the spacer means from the filter, and a scraper blade mounted on each of said shafts.

Further objects and advantages will appear from the following description and dependent claim when read in conjunction with the attached drawings, wherein:

FIG. 5 is a section substantially on line 5—5 of FIG. 3;

FIG. 6 is a section substantially on line 6—6 of FIG. 3; and

FIG. 7 is a fragmentary view in plane of an inner end mounting for the scraper blades.

Figure 1:
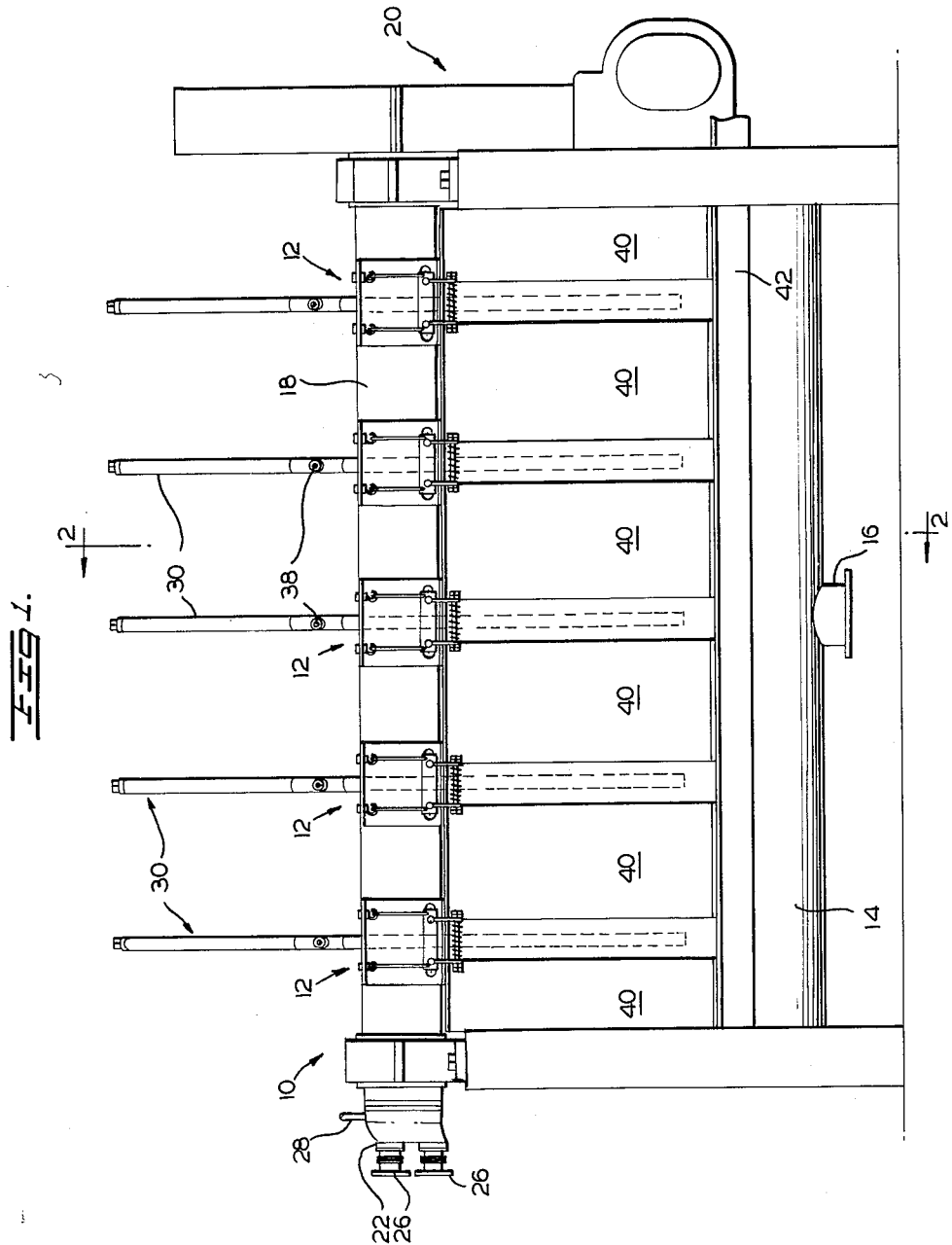
FIG. 1 is a side view of a continuous disc filter equipped with the improved suspended scraper structure of the invention.
Figure 2:
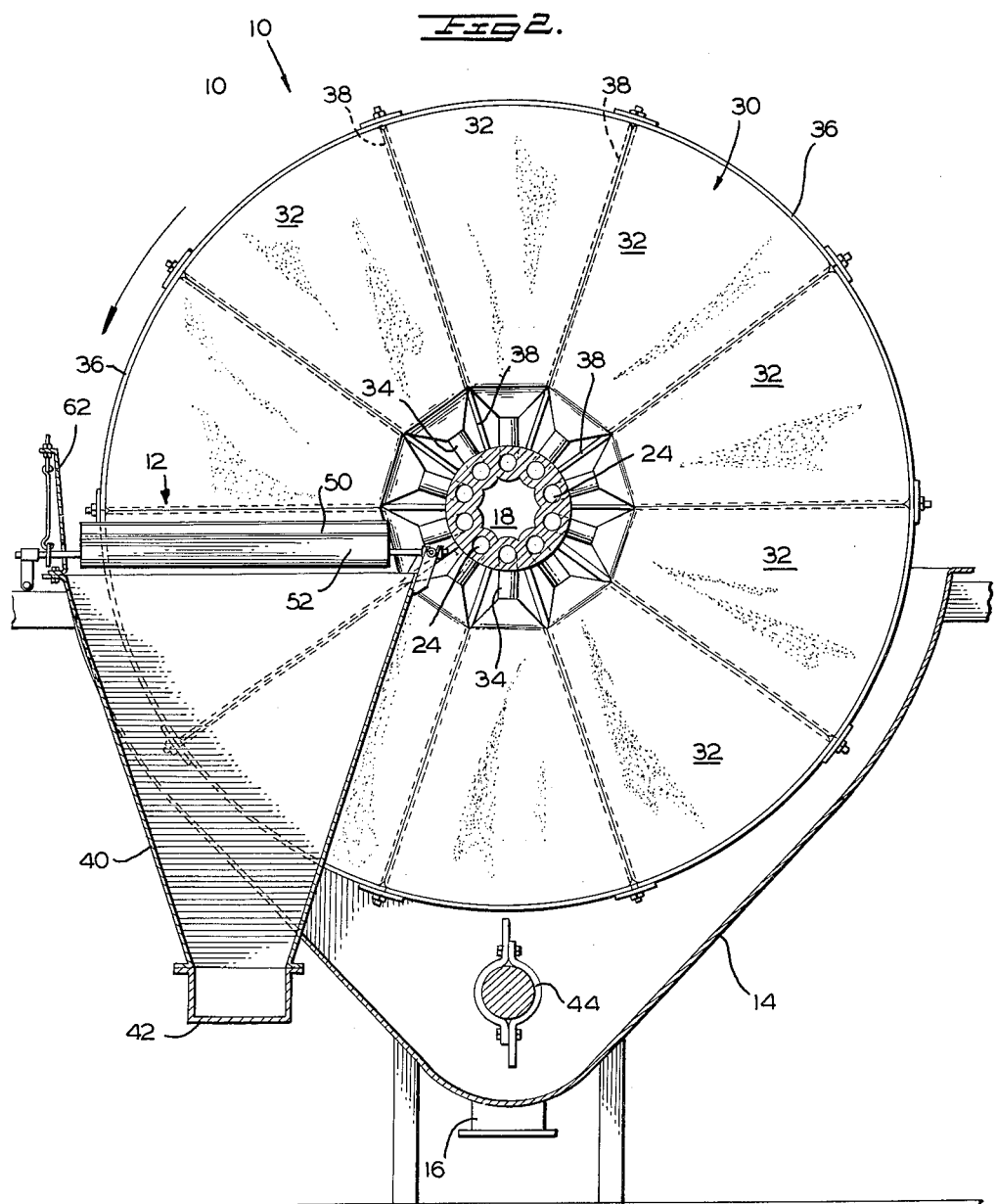
FIG. 2 is a section substantially on line 2—2 of FIG. 1.
Figure 3:
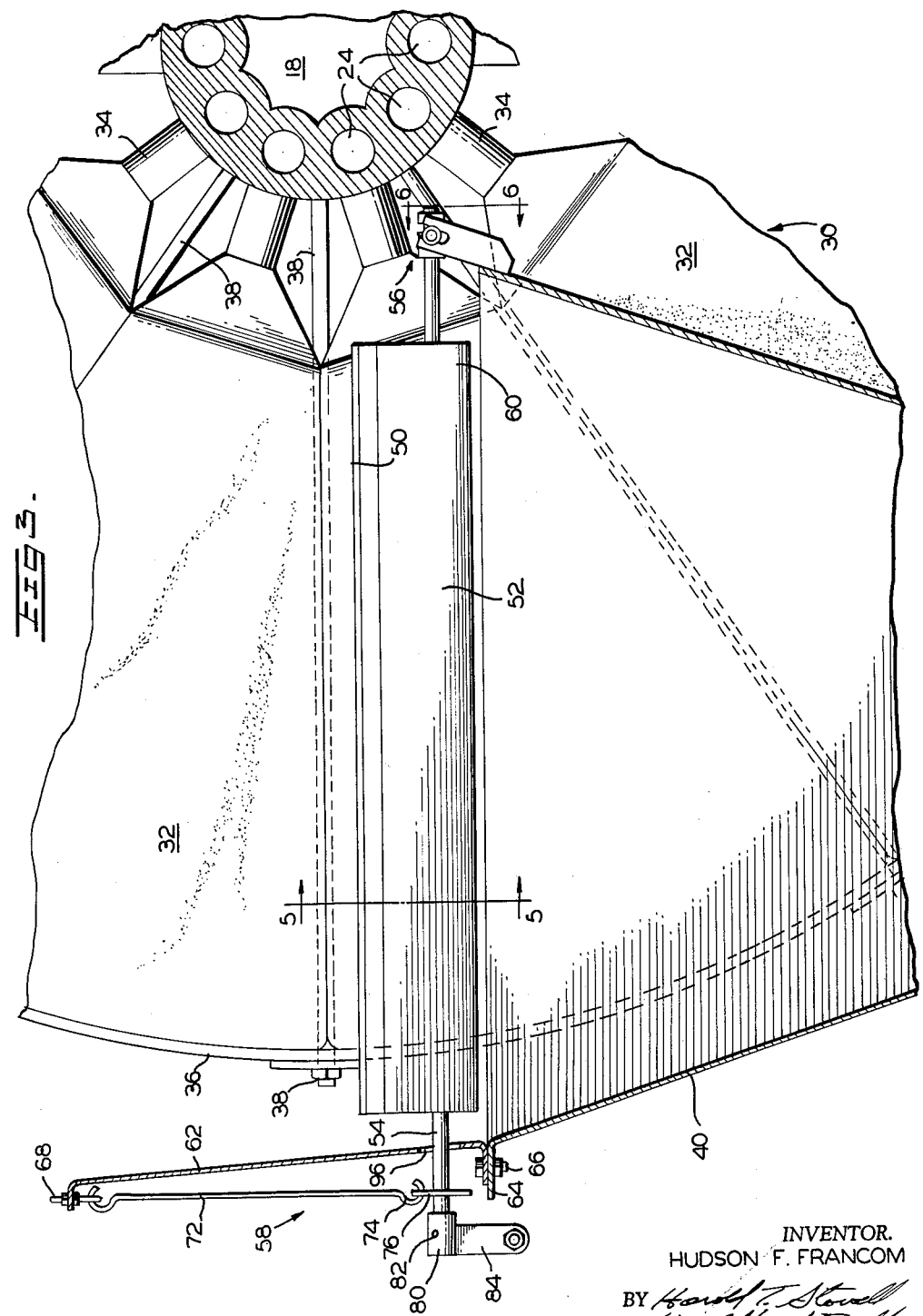
FIG. 3 is a partial sectional view looking toward a disc sector of the filter illustrated in FIGS. 1 and 2.
Figure 4:
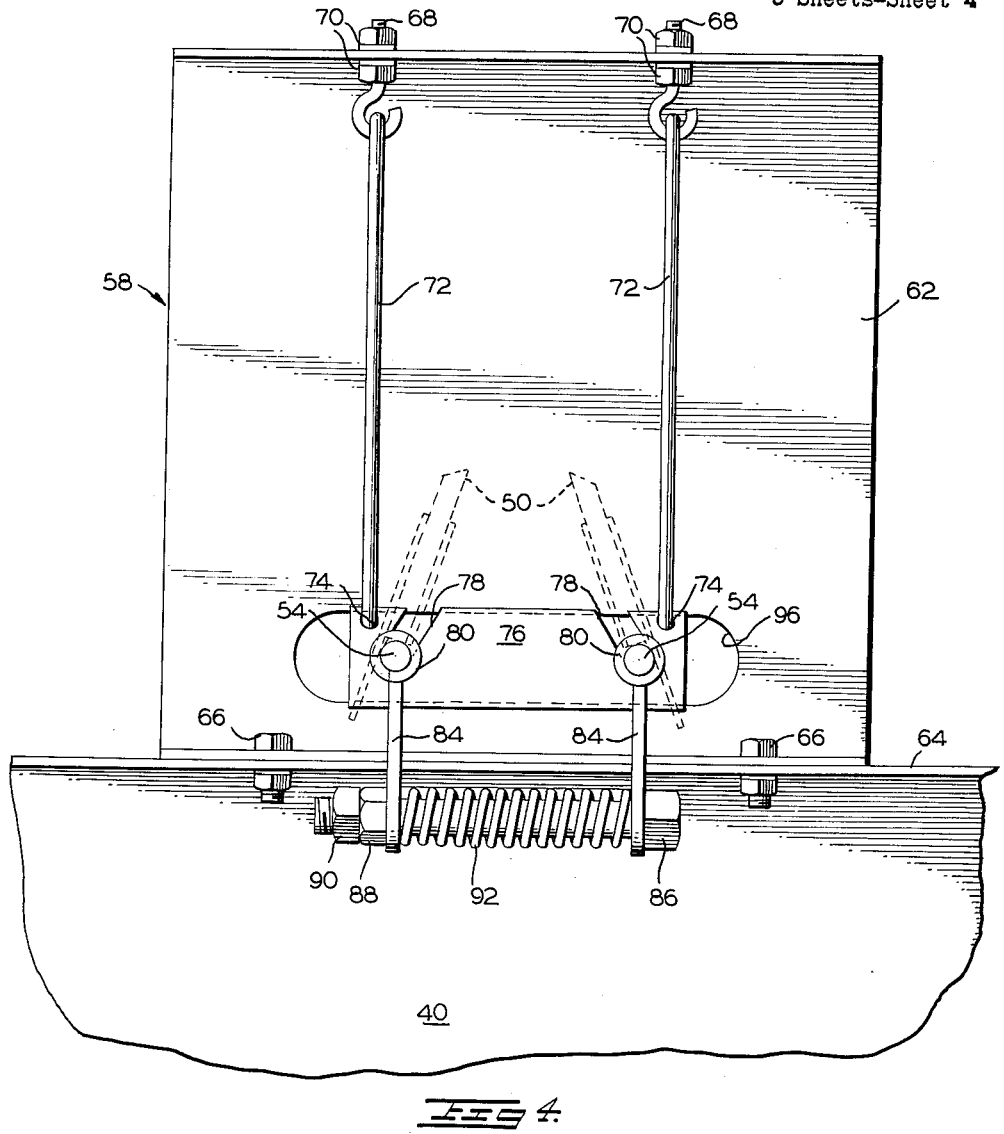
FIG. 4 is an enlarged fragmentary front elevation of one of the supports for one of the scraper blade assemblies.

Referring to FIGS. 1 and 2, a rotary disc filter 10 is shown embodying the improved suspended scraper blade assembly 12. The rotary disc filter 10 includes a tank 14 having an inlet 16 for the slurry to be filtered. The tank rotatably supports a shaft 18 having at one end drive means 20 connected to a suitable source of power for rotating the shaft 18 and at the other end a conventional filter valve 22. Internally the shaft 18 is provided with a plurality of longitudinal bores 24 which are connected to a source of vacuum or pressure through the rotary filter valve 22. The rotary filter valve is of conventional construction and is provided with port means 26 having connection to a source of vacuum and port means 28 having connection to a source of compressed air. Valves such as disclosed in United States patent application, Serial No. 679,625, Daniel M. Schwartz, filed August 22, 1957, may be advantageously employed with the filter illustrated in the drawings.

The rotatable shaft 18 supports a plurality of disc filters 30, each of which is composed of individual filter sectors 32, the inner ends 34 of which project into radial bores in the shaft 18 and provide communication between the longitudinal bores 24 within the shaft and the filter sectors. The sectors 32 may be constructed as disclosed in U.S. Patents 2,781,133, Thompson; or 2,395,225, Kurz. Each of the filter sectors 32 is maintained in aligned assembly in each respective filter disc 30 by rim means 36 and radially extending rods 38, each of which rods 38 is anchored to the rotatable shaft 18.

With this construction, it will be seen that as the shaft 18 is rotated by the drive means 20, the disc sectors progressively pass into and out of the slurry maintained in the tank 14. Each filter disc assembly is provided with access to a pair of troughs 40, with one of each pair being positioned on opposite sides of each filter disc. The troughs 40 are adapted to receive the filter cake removed by the scraper blade assembly means 12 and to discharge the filter cake into a common collecting means 42 positioned at the bottom of the troughs.

In operation, slurry to be filtered is maintained in agitation in the tank 14 by agitator means 44 and the filter valve 22 is connected to a source of vacuum and pressure fluid. Upon rotation of the shaft 18 by the drive means 20, the filter sectors 32 in passing through the slurry in the tank 18 are connected to the source of vacuum through the valve 22 and the internal passages 24 within the shaft 18 and within the filter sector so that the liquid from the slurry is drawn through the filter cloth or bag 46 secured to the outer surface of each of the filter sectors. A filter cake A is thus formed on the outer surface of the filter bags 46 as the liquid is drawn therethrough. As the shaft 18 continues to rotate in the direction of the directional arrow, continued application of vacuum to the filter sectors after passing out of the slurry within the tank draws air through the formed filter cake, thereby removing further moisture therefrom. As each filter sector 32 approaches its respective scraper blade assembly 12, the formed filter cake A is removed from the outer surface of the filter bag 46 and directed by the scraper blade face assemblies into their respective troughs 40 for disposal or use as the case may be. In the operation of rotary disc filters, it is often advantageous to connect the filter sectors to a source of pressure fluid just prior to the passage of the filter sectors between the spaced scraper blade assemblies. By connecting the filter sectors to a source of pressure fluid, the filter cloth is snap blown outwardly forcing the filter cloth into contact with each of the scraper blades as clearly illustrated in FIG. 5, whereby the filter cake is more effectively and efficiently removed from each of the filter sectors.

*The Scraper Blade Assemblies*

Each filter cake scraper blade 50 which may be constructed of rubber, plastic, wood or other suitable material is held in a channel holder 52 mounted to the respective scraper blade mounting rod 54. Each rod 54, inwardly from the respective blade 50, is mounted in an inward mounting means 56 adjacent the shaft 18 and substantially radially outwardly therefrom by suspended mounting means 58. Each scraper blade holding channel 52 is provided with an outer apron extension 60 for guiding removed cake to chutes or troughs 40.

A scraper support and shield 62 for each scraper assembly 12 is mounted on the lip 64 of tank 14 as by nut and bolt means 66. Two eye bolts 68 are fixed in place at the top of each scraper support and shield 62 as by nut means 70. Eye linkages 72 which are pivotally suspended from respective eye bolts 68 in turn pivotally support by eye and opening means 74 a front scraper support and spacer plate 76. Each plate 76 is provided with two angle slots 78 which receive the outer ends of the scraper blade mounting rods 54.

Outwardly from the front scraper spacer plate 76 is an adjustment member 80, which is nonrotatably fixed to each respective shaft 54 as by socket screw means 82. Each adjustment member 80 which may be rotationally adjusted to its respective shaft 54 by loosening socket screw means 82, has a downwardly extending arm 84. The lower ends of downwardly extended arms 84 for a pair of blades 50 are interconnected by a bolt spring assembly. Bolt 86 of bolt spring assembly has a spacing adjusting nut 88 and lock nut 90 threaded thereon to adjustably limit the maximum spacing of extended arms 84 and thereby determining the minimum spacing of the scraping edges of each pair of scraper blades 50. Resiliently compressed spring means 92 continuously urge arms 84 to the maximum adjusted spacing as determined by the bolt 86 and its adjusting nut 88 and yet permits extension arms 84 to be moved toward each other whereby the spacing of scraper blades 50 increases in a pivoting action with rods 54 about their supports in support plate 76 and at respective rear supports 56.

With this construction, as filter discs 30 pass in rotation between paired scraper blades 50, waver of the disc sectors carries the scraper blade assembly along with it from side to side in a free floating action. Elongated opening 96 in each support and shield 62 allows for transverse movement of the outer ends of scraper blade mounting rods 54. In addition, if there is excessive pressure on the scraper blades 50 as by excessive blow back pressure in the sector filter bags 46, the force is translated through the scraper blades 50 pivoting around the centers of rods 54 to move the lower extremities of arms 84 toward each other against the resilient force of spring 92 thus increasing the spacing between the scraper blades.

Referring now particularly to FIGS. 5, 6, and 7, inward mounting means 56 includes a mount member 98 for each rod 54 which is fixed to the inward end of the respective chute portion 40 of tank 14. Each mount member 98 adjustably mounts thereon, as by positioning nuts 100 on a threaded shank 102, an inner pivot mount means 104, FIG. 7. Each mount means 104 pivotally receives the inner end of the respective shaft 54, a pair of collars 106 secured to each shaft on opposite sides of mount means 104 restrict transverse movement of each shaft 54. Mount means 104 is relatively thin in order that deposits of slurry and cake thereon will not impede pivoting of the respective shafts 54 therein.

From the foregoing description it will be seen that the present invention provides a rotary disc filter cake blade scraping structure which, by means of a free floating suspended mounting in combination with spring biasing and blade spacing adjustment means, solves problems of scraper blade binding, filter bag cutting and disc sector destruction commonly encountered with blade structures of the prior art. The problems are overcome by the filter cake scraping blades freely adapting to and moving in a free floating fashion with waver of the disc sectors along with resilient balancing to the adjusted spacing of paired scraper blades in adapting to excessive separating pressures thereon.

While there has been shown and described one embodiment of the present invention various changes and modifications may be effected without departing from the spirit and scope of the invention as defined in the appended claim. For example, the link means suspending the spacer plate supporting the outer ends of the blade support rods may comprise flexible cables, or spring elements, either of the leaf or helical type. It will also be apparent that where, for example, leaf springs are provided to yieldably support the spacer plate that the connection between the leaf springs and the filter tank may be below the spacer plate.

I claim:

In a rotary disc filter including a housing having a slurry tank associated therewith and a plurality of filter discs mounted for rotation through the tank, a scraper blade assembly comprising a scraper blade extending adjacent each of the filtering surfaces of said discs, means mounting one end of said scraper blades for pivotal movement adjacent the axis of rotation of the said discs, a support member spaced from the radially outer edge of each disc mounting in fixed spaced relationship the radially outer ends of the pair of scraper blades associated with each disc, and yieldable means supporting the said support member from a wall of the tank of the filter, said yieldable means including spaced swingable suspension means carried by the housing of said filter and having their lower ends attached to said support member mounting the radially outer ends of each of the pairs of scraper blades thereby mounting the support member for arcuate movement in a plane normal to the radial plane of the disc.

References Cited in the file of this patent

UNITED STATES PATENTS

| | | |
|---|---|---|
| 1,602,829 | McCaskell | Oct. 12, 1926 |
| 2,669,360 | Little | Feb. 16, 1954 |
| 2,885,083 | Peterson et al. | May 5, 1959 |